(12) United States Patent
Kang et al.

(10) Patent No.: US 12,042,863 B2
(45) Date of Patent: Jul. 23, 2024

(54) 3D PRINTER WITH RESIDUAL POWDER REMOVAL DEVICE

(71) Applicant: DAEGUNTECH CO., LTD, Changwon-si (KR)

(72) Inventors: Sung Min Kang, Changwon-si (KR); Su Bong Lee, Changwon-si (KR); Ki Soo Shin, Changwon-si (KR)

(73) Assignee: DAEGUNTECH CO., LTD, Changwon-si (KR)

( * ) Notice: Subject to any disclaimer, the term of this patent is extended or adjusted under 35 U.S.C. 154(b) by 434 days.

(21) Appl. No.: 17/629,386

(22) PCT Filed: Jul. 22, 2020

(86) PCT No.: PCT/KR2020/009633
§ 371 (c)(1),
(2) Date: Jan. 23, 2022

(87) PCT Pub. No.: WO2021/015542
PCT Pub. Date: Jan. 28, 2021

(65) Prior Publication Data
US 2022/0274179 A1   Sep. 1, 2022

(30) Foreign Application Priority Data

Jul. 25, 2019 (KR) .......................... 10-2019-0089937

(51) Int. Cl.
*B22F 10/68* (2021.01)
*B22F 10/73* (2021.01)
(Continued)

(52) U.S. Cl.
CPC .............. *B22F 10/68* (2021.01); *B22F 10/73* (2021.01); *B22F 12/70* (2021.01); *B22F 12/90* (2021.01);
(Continued)

(58) Field of Classification Search
CPC ........ B22F 10/68; B22F 10/73; B22F 10/322; B22F 10/64; B22F 10/00; B22F 12/70;
(Continued)

(56) References Cited

U.S. PATENT DOCUMENTS

2017/0348771 A1   12/2017   Kawada et al.

FOREIGN PATENT DOCUMENTS

KR   10-2017-0014323 A   2/2017
KR   10-2017-0014618 A   2/2017
(Continued)

OTHER PUBLICATIONS

International Search Report of PCT/KR2020/009633 published on Jan. 28, 2021.
Written opinion of PCT/KR2020/009633 published on Jan. 28, 2021.

*Primary Examiner* — Moshe Wilensky (57) ABSTRACT

Provided is a 3D printer having a residual powder removal device, including: a cabinet configured to form an exterior and protect a plurality of parts embedded therein, a chamber configured to form a printing space where a 3D part is formed by being irradiated with a laser from a laser irradiator inside the cabinet, a concentration measurer configured to measure a concentration of metal powder scattered inside the chamber, a powder transfer unit configured to transfer the metal powder from inside the chamber, and a residual powder removal device configured to spray an inert gas into the chamber to forcibly scatter cohered metal powder, discharge the metal powder scattered inside the chamber to the outside along with the inert gas, and cause the metal powder to pass through a filter assembly so that the metal powder is filtered and the residual metal powder is removed from inside the chamber.

5 Claims, 9 Drawing Sheets

(51) Int. Cl.
*B22F 12/70* (2021.01)
*B22F 12/90* (2021.01)
 B22F 10/322 (2021.01)
 B33Y 30/00 (2015.01)
 B33Y 40/20 (2020.01)

(52) U.S. Cl.
CPC ............. *B22F 10/322* (2021.01); *B33Y 30/00* (2014.12); *B33Y 40/20* (2020.01)

(58) Field of Classification Search
CPC ......... B22F 12/90; B33Y 30/00; B33Y 40/20; B33Y 40/00; B08B 5/02; B08B 7/02; B29C 64/35
See application file for complete search history.

(56) References Cited

FOREIGN PATENT DOCUMENTS

| | | |
|---|---|---|
| KR | 10-1715124 B1 | 3/2017 |
| KR | 10-1874092 B1 | 7/2018 |
| KR | 10-2018-0103334 A | 9/2018 |
| KR | 10-1929751 B1 | 12/2018 |
| KR | 10-2019-0067403 A | 6/2019 |
| KR | 10-2090674 B1 | 3/2020 |
| WO | 2017-085470 A1 | 5/2017 |

FIG. 9

3D PRINTER WITH RESIDUAL POWDER REMOVAL DEVICE

TECHNICAL FIELD

The present invention relates to a 3D printer having a residual powder removal device, in which a 3D printer for forming a 3D part while continuously supplying a metal powder having a risk of explosion is equipped with a residual powder removal device for removing the residual powder, so that the convenience of use is improved.

The present invention relates to a 3D printer having a residual powder removal device in which a vibration generator is provided on one side of the residual powder removal device to reduce the cohesive strength of the residual powder so that the powder is quickly removed.

The present invention relates to a 3D printer having a residual powder removal device in which a filter is provided on one side of the residual powder removal device and the filtered residual powder is separated from the filter and gathered so that the powder recovery rate is improved.

The present invention relates to a 3D printer having a residual powder removal device in which a scattering unit is provided to scatter the residual powder attached to an inner wall of a chamber so that the residual powder is removed more quickly.

The present invention relates to a 3D printer having a residual powder removal device in which an inert gas is sprayed by the scattering unit so that the risk of explosion is prevented in advance.

BACKGROUND OF THE INVENTION

Conventionally, traditional processing methods such as casting or forging have been used to manufacture 3D parts. In addition, in order to maintain the quality of the part when using such a manufacturing method, it had to be performed by a worker with specialized knowledge.

In recent years, a 3D printer has been used as a device for processing a 3D part and is gradually replacing the traditional processing method because of the advantage that even non-professionals can easily produce a 3D part.

In other words, a 3D printer is a device that produces an actual 3D form on the basis of an input 2D drawing as if printing letters or pictures. The application of 3D printing technology has been expanded to the fields of automobiles, medical care, art, and education, and 3D printing technology is being widely used for the purpose of producing various models.

The principles of 3D printer may be classified into the cutting type and the lamination type, and most of the 3D printers actually in use fall into the lamination type that does not cause loss of material.

Figure 1:
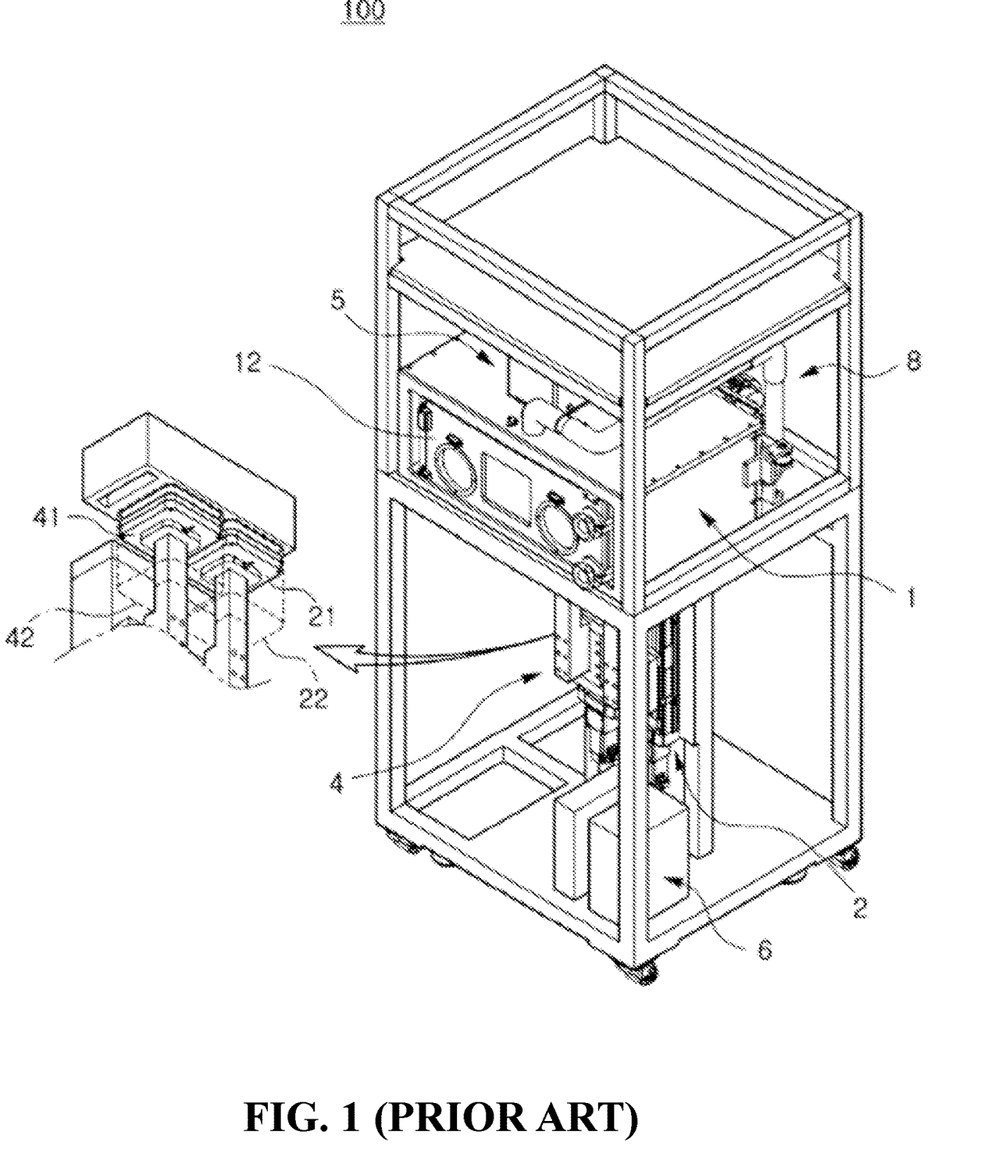
FIG. 1 is a perspective view showing a configuration of a powder application device, which is used in a 3D printer, and a 3D printer including the same that are disclosed in Korean Patent Registration No. 10-1715124.

The lamination-type 3D printer produces a printed object by performing lamination through a method of curing by projecting a laser. Korean Patent Registration No. 10-1715124 discloses a powder application device, which is used in a 3D printer that uses metal powder for printing as in FIG. 1, and a 3D printer including the same.

However, the related art has the following problems.

That is, in the above patent, metal powder is described as being used as a raw material, but it is difficult to produce a printed object using metal powder having high reactivity with water or oxygen, such as magnesium powder.

In more detail, magnesium is lighter than aluminum and is widely used in aircraft parts. Magnesium is a material also used in aircraft engine parts due to having excellent high-temperature heat resistance when alloyed by mixing with other components.

However, magnesium having such advantages has a risk of explosion due to having high reactivity with water or oxygen, and thus care must be taken in handling magnesium.

Also, the above related art has a problem in that the convenience of use and productivity are reduced because, in a case where forming of a 3D part is completed, the formed 3D part should be moved to a separate space to receive post-processing (removal of excess metal powder remaining in a powder state without being sintered).

Figure 2:
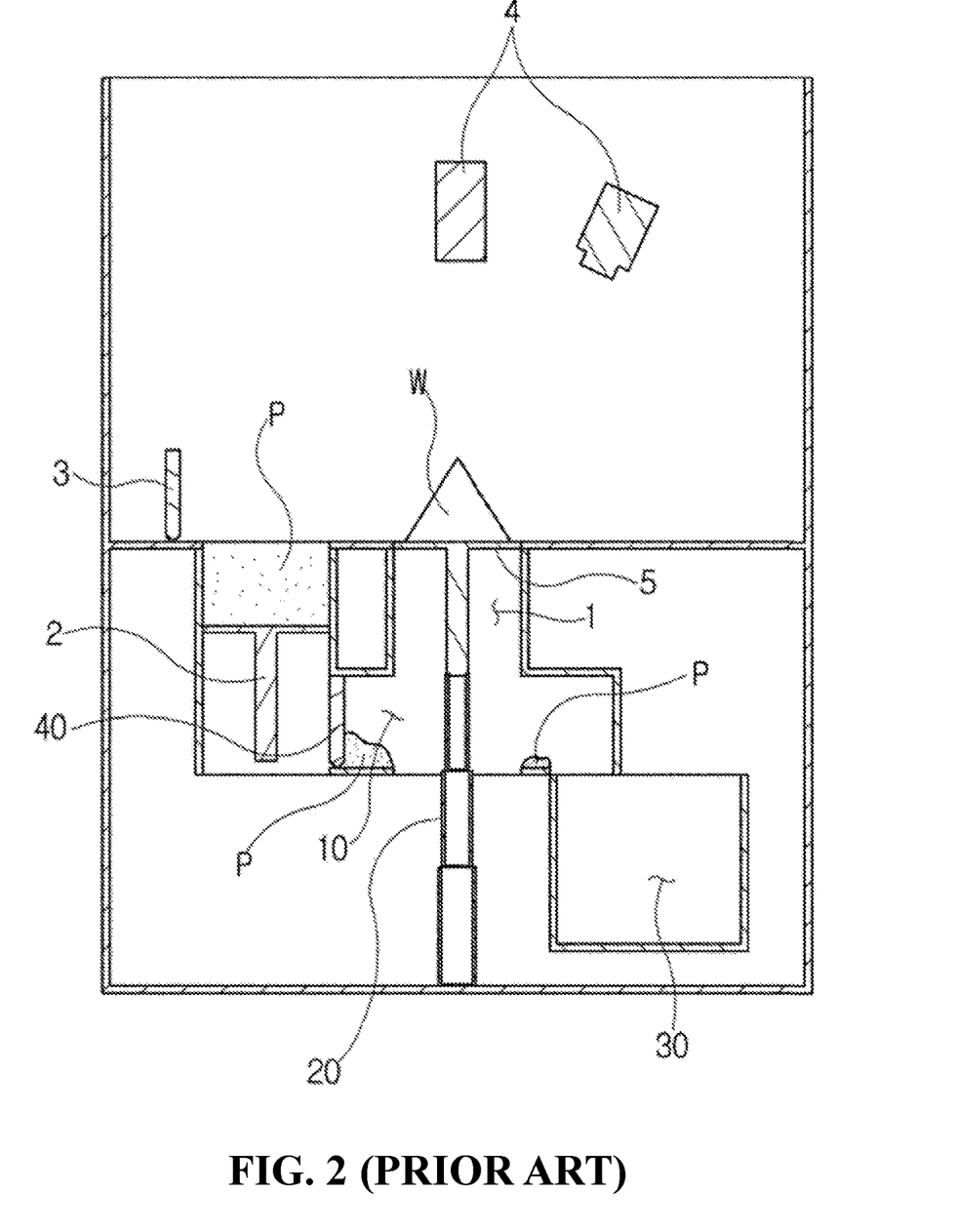
FIG. 2 is a cross-sectional view showing a configuration of a residual powder removal device of a laser sintering type 3D printer that is disclosed in Korean Patent Publication No. 10-2017-0014618.

Accordingly, as illustrated in FIG. 2, Korean Patent Publication No. 10-2017-0014618 discloses a residual powder removal device of a laser sintering type 3D printer, the residual powder removal device including a pickup chamber (10) in which the residual powder is deposited under a build chamber (1) in which the powder is sintered into a workpiece by a laser, a lifting/lowering mechanism (20) configured to move the workpiece sintered in the build chamber (1) and the residual powder to the pickup chamber (10) together with a platform (5), a collection chamber (30) configured to collect the powder of the pickup chamber (10) that is transferred thereto, and a pickup blade (40) configured to transfer the powder in the pickup chamber (10) to the collection chamber (30).

Figure 3:
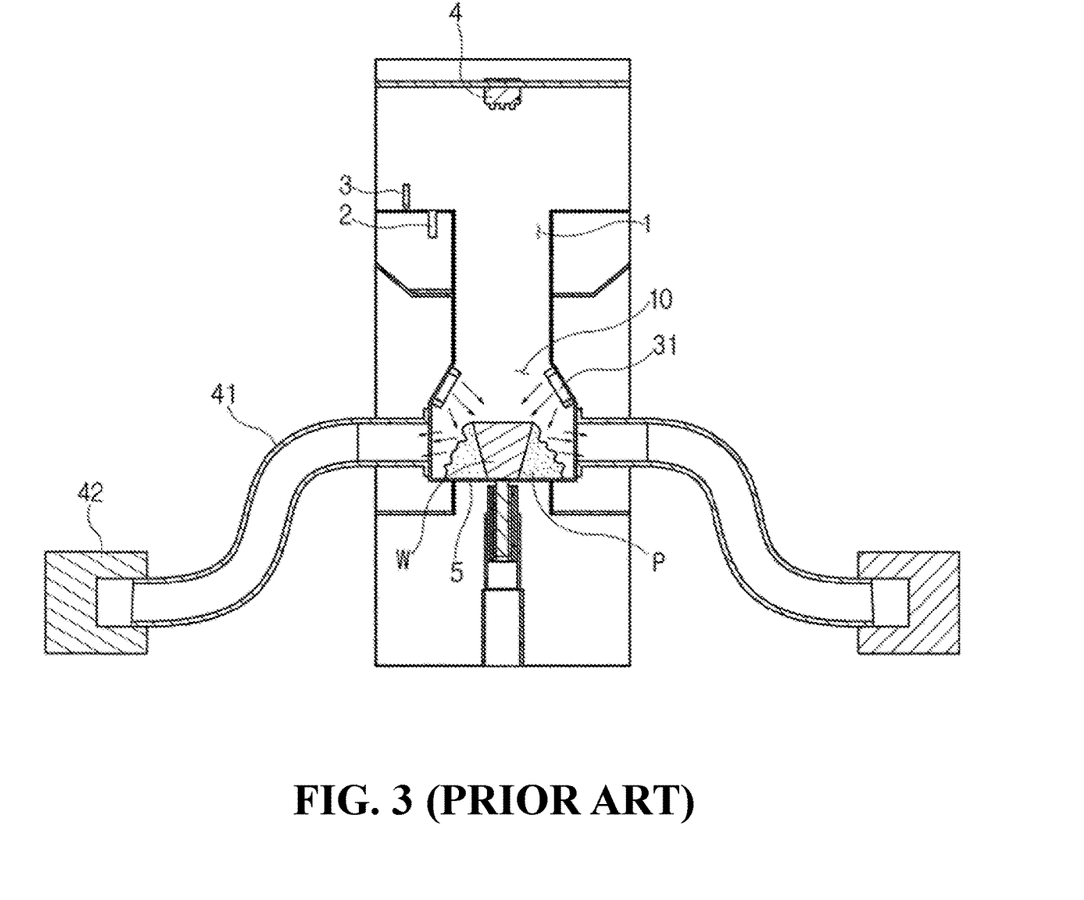
FIG. 3 is a cross-sectional view showing a configuration of a residual powder removal device of a laser sintering type 3D printer that is disclosed in Korean Patent Publication No. 10-2017-0014323.

Also, as illustrated in FIG. 3, Korean Patent Publication No. 10-2017-0014323 discloses a residual powder removal device of a laser sintering type 3D printer, the residual powder removal device including a blowing mechanism configured to remove powder (P) from a workpiece (W) inside a suction chamber (10) and a suction mechanism configured to suction and collect the powder (P) inside the suction chamber (10), so that the residual powder around the workpiece (W) can be separated and removed easily and quickly.

Figure 4:
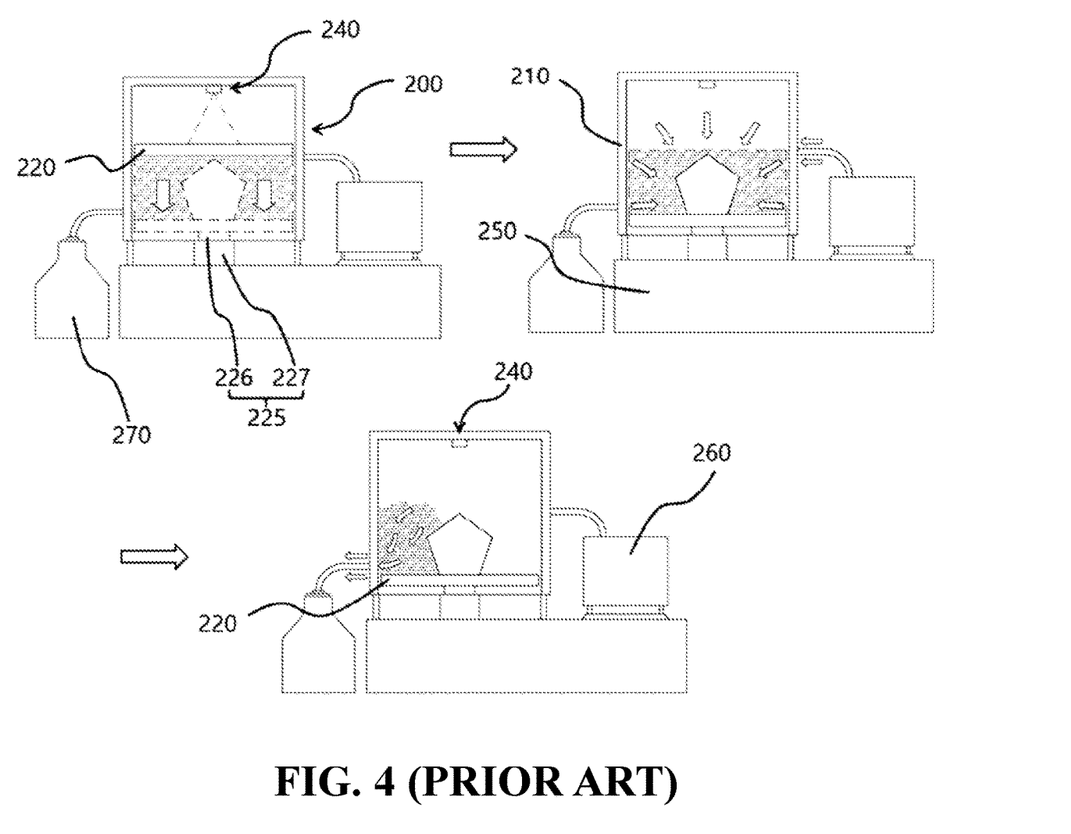
FIG. 4 is a conceptual diagram illustrating a 3D printer powder recovery device using an air compressor and air pressure that is disclosed in Korean Patent Publication No. 10-2018-0103334.

Also, as illustrated in FIG. 4, Korean Patent Publication No. 10-2018-0103334 discloses a 3D printer powder recovery device using an air compressor and air pressure, the 3D printer powder recovery device including an air compressor (260) configured to maintain a predetermined air pressure inside a part shaping chamber (210) and a powder suction device (270) configured to recover unsintered powder particles from inside the part shaping chamber (210) in a state of being disposed on the other side of the part shaping chamber (210).

However, the above related art has the following problems.

That is, the above inventions are for removing powder from a workpiece, and there is a problem in that the convenience of use is reduced when attempting to produce a workpiece using powder of a material different from the powder used.

More specifically, when, after manufacturing a workpiece using titanium (Ti) powder is completed, it is attempted to manufacture a workpiece made of magnesium (Mg) by changing the material in the same chamber, all of the existing powder inside the chamber should be removed, but with the above inventions, it is difficult to remove even the powder present on corners inside the chamber.

Also, in a case where the powder used is nano-sized, the powder has a large cohesive strength, and it takes a long time when the powder is removed manually. Thus, the convenience of use is reduced, and productivity is lowered, making it undesirable.

In addition, in a case where, while some of the existing powder remains, a different material is added to produce a workpiece, the existing powder acts as an impurity and causes defects in the subsequently-produced workpiece, making it undesirable.

OBJECT OF THE INVENTION

The present invention is directed to providing a 3D printer having a residual powder removal device, in which a residual powder removal device for removing the residual powder is provided so that the convenience of use is improved.

The present invention is also directed to providing a 3D printer having a residual powder removal device in which a vibration generator is provided on one side of the residual powder removal device to reduce the cohesive strength of the residual powder so that the powder is quickly removed.

The present invention is also directed to providing a 3D printer having a residual powder removal device in which a filter is provided on one side of the residual powder removal device and the filtered residual powder is separated from the filter and gathered so that the powder recovery rate is improved.

The present invention is also directed to providing a 3D printer having a residual powder removal device in which a scattering unit is provided to scatter the residual powder attached to an inner wall of a chamber so that the residual powder is removed more quickly.

The present invention is also directed to providing a 3D printer having a residual powder removal device in which an inert gas is sprayed by the scattering unit so that the risk of explosion is prevented in advance.

SUMMARY OF THE INVENTION

One embodiment of the present invention provides a 3D printer having a residual powder removal device, the 3D printer including a cabinet configured to form an exterior and protect a plurality of parts embedded therein, a chamber configured to form a printing space where a 3D part is formed by being irradiated with a laser from a laser irradiator inside the cabinet, a concentration measurer configured to measure a concentration of metal powder scattered inside the chamber, a powder transfer unit configured to transfer the metal powder from inside the chamber, and a residual powder removal device configured to spray an inert gas into the chamber to forcibly scatter cohered metal powder, discharge the metal powder scattered inside the chamber to the outside along with the inert gas, and cause the metal powder to pass through a filter assembly so that the metal powder is filtered and the residual metal powder is removed from inside the chamber.

An inner edge of the chamber may be formed to be rounded.

The residual powder removal device may include a pump configured to force a gas flow, a gas flow path configured to guide a gas, which is forced to flow by the pump, to pass through the inside of the chamber, the filter assembly installed on one side of the gas flow path to filter the residual powder included in the gas, a vibration generator configured to generate vibrations on one side of the gas flow path and the filter assembly to limit the cohesion of the residual powder, a gas supply path configured to communicate with the gas flow path to supply an inert gas, and a scattering unit disposed inside the chamber and configured to communicate with the gas flow path and spray the inert gas into the chamber to scatter the residual powder.

The filter assembly may include a filter configured to form an inert gas flow path in a direction from the outside to the inside to filter the residual powder, a filter housing configured to form a space in a state in which the filter is accommodated therein and communicate with the gas flow path to cause the inert gas to pass therethrough and be exhausted, and a regeneration vibration generator configured to generate vibrations on one side of the filter housing to separate the residual powder cohered in the filter and regenerate the filter.

A powder collection space configured to collect the residual powder falling after being separated from the filter due to the regeneration vibration generator may be provided inside the filter housing.

The scattering unit may include a plurality of nozzles and change a direction in which the inert gas is sprayed.

The residual powder removal device may be operated or stopped in accordance with the concentration measurer.

ADVANTAGES OF INVENTION

According to the present invention, a residual powder removal device for removing the residual powder is provided, and thus the convenience of use can be improved.

Also, a vibration generator is provided on one side of the residual powder removal device to reduce the cohesive strength of the residual powder, and thus the powder can be quickly removed.

Also, a filter is provided on one side of the residual powder removal device, and the filtered residual powder is separated from the filter and gathered. Thus, the powder recovery rate can be improved.

In addition, a scattering unit is provided to scatter the residual powder attached to an inner wall of a chamber, and thus the residual powder can be removed more quickly.

Furthermore, an inert gas is sprayed by the scattering unit, and thus the risk of explosion can be prevented in advance.

DETAILED DESCRIPTION OF THE INVENTION

Hereinafter, a configuration of a 3D printer (hereinafter referred to as "3D printer 100") having a residual powder removal device 200 according to the present invention will be described with reference to FIGS. 5 and 6.

Figure 5:
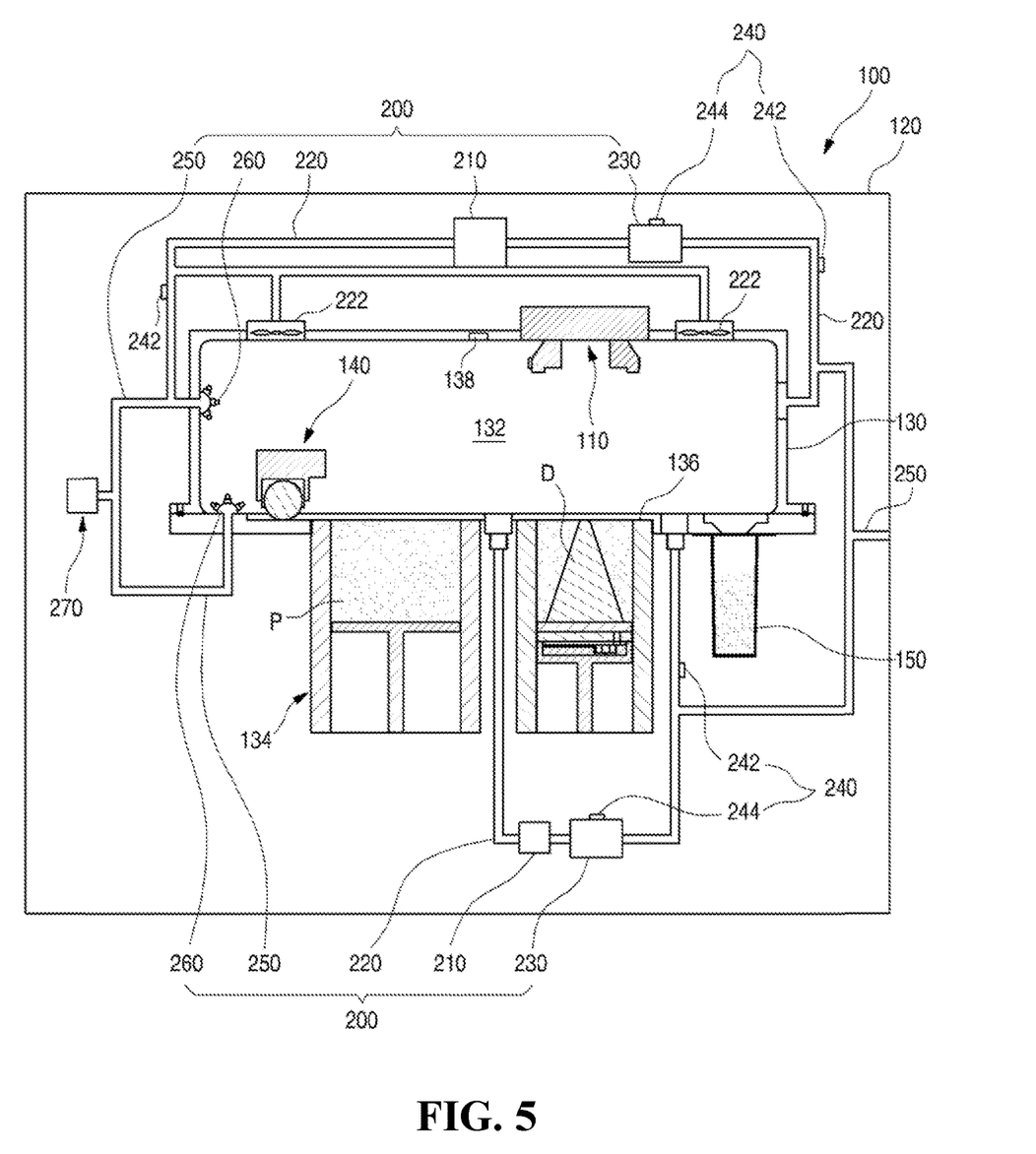
FIG. 5 is a cross-sectional view showing a configuration of a 3D printer having a residual powder removal device according to the present invention.
Figure 6:
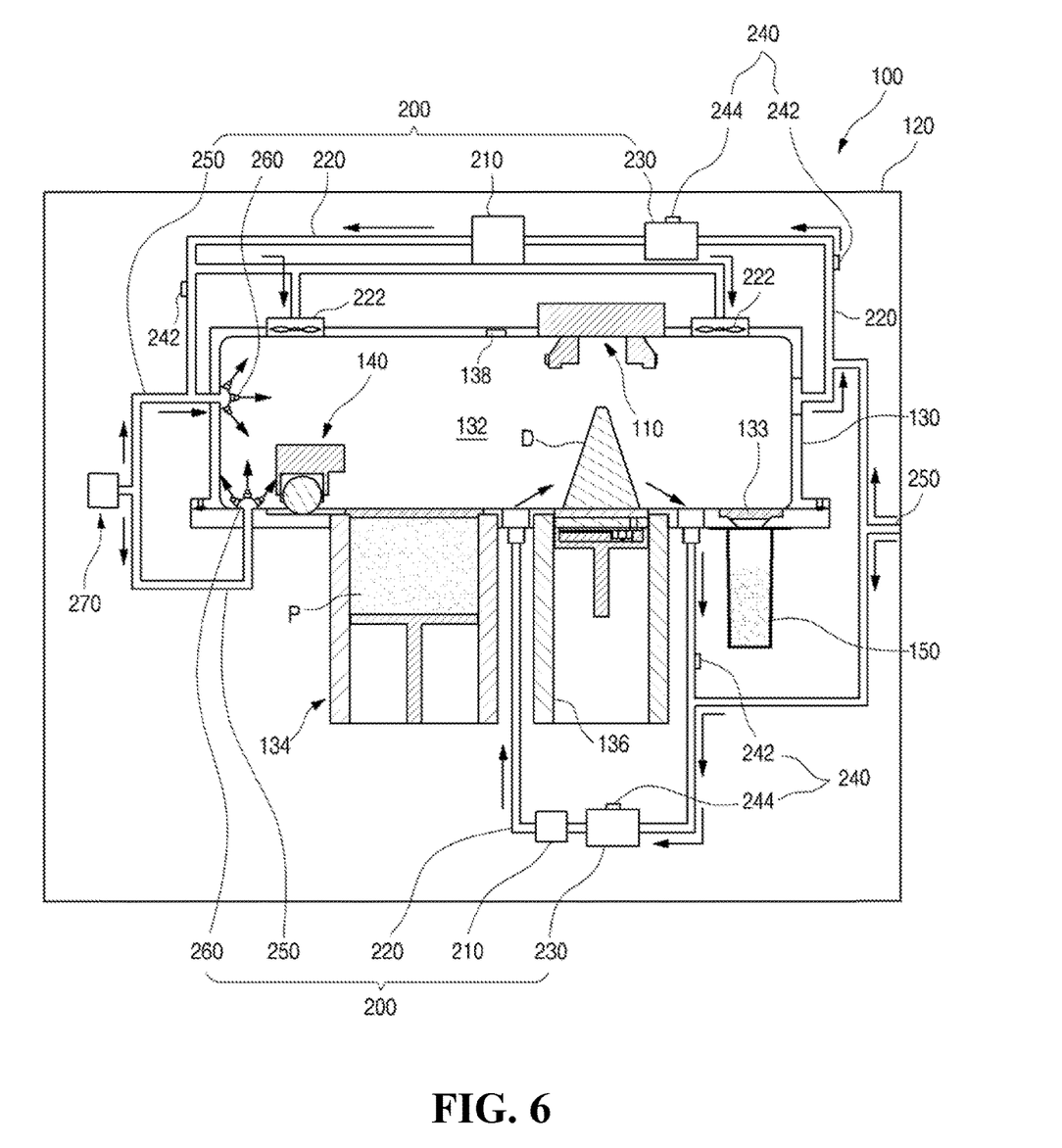
FIG. 6 is a cross-sectional view showing actions of the 3D printer having the residual powder removal device according to the present invention.

FIG. 5 is a cross-sectional view showing a configuration of the 3D printer 100 having the residual powder removal device 200 according to the present invention, and FIG. 6 is a cross-sectional view showing actions of the 3D printer 100 having the residual powder removal device 200 according to the present invention.

Prior to the description, it should be noted that terms or words used in this specification and the claims are not to be interpreted as having general or dictionary meanings and should be interpreted as having meanings and concepts which correspond with the technical spirit of the present invention based on the principle that the inventor can properly define the concept of the terms to describe his or her own invention in the best possible way.

Embodiments described herein and configurations illustrated in the drawings are merely preferred embodiments of the present invention and do not represent the entire technical spirit of the present invention. Therefore, it should be understood that various equivalents and modified examples which can replace the embodiments may be present at the time of filing this application.

As illustrated in the drawings, the 3D printer 100 is configured to store a predetermined amount of metal powder P and supply the metal powder P to a lower side of a laser irradiator 110 by a predetermined thickness.

Also, due to using the metal powder P, which has a risk of explosion, as a material, the 3D printer 100 is operated in an inert atmosphere so that the metal powder P does not come into contact with air or water.

That is, an exterior of the 3D printer 100 is formed by a cabinet 120 having a rectangular parallelepiped shape, and a plurality of parts are embedded inside the cabinet 120.

Also, a chamber 130 is disposed inside the cabinet 120. The chamber 130 is configured so that the inside thereof may be sealed. A printing space 132 is disposed in the chamber 130, and the laser irradiator 110 is installed at an upper portion of the printing space 132.

An inner edge of the chamber 130 is formed to be rounded so that, during operation of the residual powder removal device 200 which will be described below, the chamber 130 allows the residual metal powder P therein to more easily scatter and prevents the cohesion of the residual powder in a corner.

A concentration measurer 138 is disposed on a central ceiling inside the chamber 130. The concentration measurer 138 is a configuration for measuring the concentration of the metal powder P scattered inside the chamber 130. The concentration measurer 138 is a configuration that continuously measures the concentration during operation of the residual powder removal device 200 and, when the concentration is lower than a predetermined concentration, allows the operation of the residual powder removal device 200 to be stopped.

Therefore, the residual powder removal device 200 keeps operating or stops operating in accordance with a value of the concentration of the metal powder P that is measured by the concentration measurer 138.

To this end, a control panel may be disposed in the 3D printer 100, and preferably, the control panel may perform a task of comparing the concentration of the metal powder P measured by the concentration measurer 138 with the predetermined concentration and may be set to stop the operation of the residual powder removal device 200 in a case where the measured concentration of the metal powder P is less than or equal to the predetermined concentration.

On a bottom surface of the printing space 132, a storage 134 in which the metal powder P is stored and a forming part 136 configured to be irradiated with a laser from the laser irradiator 110 to form a 3D part D when the metal powder P stored in the storage 134 is laminated on an upper side thereof are formed.

The storage 134 and the forming part 136 move downward or upward in opposite directions from each other while the 3D part D is being formed and thus allow the supply of the metal powder P and the formation of the 3D part D, and a powder transfer unit 140 configured to transfer the metal powder P is installed at a left side of the storage 134.

The powder transfer unit 140 is a configuration that, when the storage 134 rises as much as a predetermined height and supplies the metal powder P to the printing space 132, allows the metal powder P to be spread in a uniform thickness while moving rightward and to be laminated with a uniform height even on the upper side of the forming part 136.

Therefore, the metal powder P is plasticized by melting due to being irradiated with the laser from the laser irradiator 110, and as the supply of the metal powder P by the powder transfer unit 140 and the downward movement of the forming part 136 are repeated multiple times, the formation of the 3D part D becomes possible.

A powder recovery container 150 is disposed at a right side of the forming part 136. The powder recovery container 150 is where the excess of the metal powder P, which is thinly spread due to the powder transfer unit 140, falls and gathers. The powder recovery container 150 may be separated and reused by a user as necessary.

Hereinafter, a detailed configuration of the residual powder removal device 200, which is the main component of the present invention, will be described.

The residual powder removal device 200, which is for removing all of the remaining metal powder P inside the chamber 130 when attempting to stop the production of the 3D part D or replace the metal powder P with another metal powder P made of a different material, is disposed in the 3D printer 100.

The residual powder removal device 200 is a configuration that sprays an inert gas into the chamber 130 to forcibly scatter the cohered metal powder P, discharges the scattered metal powder P to the outside of the chamber 130 along with the inert gas, and then causes the metal powder P to pass through a filter assembly 230 so that the metal powder P is filtered and the residual metal powder P is removed from inside the chamber 130.

That is, the residual powder removal device 200 is for collecting all of the metal powder P remaining inside the chamber 130 outside the chamber 130, and in an embodiment of the present invention, the residual powder removal device 200 is installed at each of an upper portion and a lower portion of the chamber 130.

The residual powder removal device 200 includes a pump 210 configured to force a gas flow, a gas flow path 220 configured to guide a gas, which is forced to flow by the pump 210, to pass through the inside of the chamber 130, the filter assembly 230 installed on one side of the gas flow path 220 to filter the residual powder included in the gas, a vibration generator 240 configured to generate vibrations on one side of the gas flow path 220 and the filter assembly 230 to limit the cohesion of the residual powder, a gas supply path 250 configured to communicate with the gas flow path 220 to supply an inert gas, and a scattering unit 260 disposed inside the chamber 130 and configured to communicate with the gas flow path 220 and spray the inert gas into the chamber 130 to scatter the residual powder.

The pump 210 is a configuration that is disposed on the gas flow path 220 to force a one-way flow of the inert gas into the gas flow path 220.

In an embodiment of the present invention, the pump 210 is disposed at each of an upper side and a lower side of the chamber 130. In an embodiment of the present invention, the pump 210 is configured to allow introduction of the inert gas to a left side and a central bottom surface inside the chamber 130.

The gas flow path 220 is formed in a tubular shape so that the gas flow path 220 surrounds an outer side of the chamber 130 and both ends of the gas flow path 220 communicate with the inside of the chamber 130 at different sites. The gas flow path 220 of the residual powder removal device 200 that is installed at an upper side is connected so that a left-side central portion and a right-side central portion of the chamber 130 communicate with each other, and the gas flow path 220 of the residual powder removal device 200 that is installed at a lower side is connected so that a left side portion and a right side portion of the chamber 130 communicate with each other.

Also, the gas flow path 220 installed at the upper side has one branched side and communicates with each of a left side and a right side of an upper surface of the chamber 130. Also, a blower fan 222 is installed at each branched end of the gas flow path 220 and configured to generate downward wind power using rotary power.

Therefore, inside the chamber 130, a strong gas flow may occur due to the operation of the blower fan 222 and cause scattering of the residual powder.

The filter assembly 230 is a configuration for selectively filtering the residual powder transferred along with the inert gas through the gas flow path 220. The filter assembly 230 will be described in detail below.

The gas supply path 250 is disposed at an outer side of the gas flow path 220. The gas supply path 250 is a configuration for causing a forced flow of the inert gas and supplying the inert gas to the gas flow path from outside the chamber 130.

In an embodiment of the present invention, the gas supply path 250 is configured to supply argon gas or nitrogen gas, and a cylinder 270 in which the inert gas is stored communicates with the gas flow path 250. The other end of the cylinder 270 is configured to communicate with the inside of the gas supply path 250.

More specifically, the gas supply path 250 is branched to upper and lower paths and configured to communicate with the gas flow path 220 or the chamber 130.

Therefore, the inert gas introduced through the gas supply path 250 may flow in directions indicated by arrows of FIG. 6 and be introduced into the chamber 130.

The vibration generator 240 is a configuration for receiving power from the outside and generating vibrations. One or more vibration generators 240 are installed at each of the gas flow path 220 and the filter assembly 230 to perform a function of limiting the cohesion of the metal powder P inside the gas flow path 220 and the filter assembly 230.

That is, the vibration generator 240 includes an expansion vibration generator 242 installed at the gas flow path 220 and a regeneration vibration generator 244 installed at the filter assembly 230.

The expansion vibration generator 242 is a configuration that is installed at one side of the gas flow path 220 and prevents narrowing of a duct due to the cohesion and agglomeration of the metal powder P on an inner wall of the gas flow path 220 in order to allow the inside of the gas flow path 220 to maintain an expanded state.

Also, the regeneration vibration generator 244 is a configuration that shakes off the metal powder P accumulated inside the filter assembly 230 and causes the metal powder P to fall so that a filtering function of the filter assembly 230 is regenerated.

The scattering unit 260 is installed inside the chamber 130. The scattering unit 260 is configured to communicate with an end of the gas flow path 220 and strongly spray the inert gas into the chamber 130. The scattering unit 260 is configured to include a plurality of nozzles and spray the inert gas at various angles to scatter the metal powder P attached to the inner wall of the chamber 130.

Also, the scattering unit 260 is configured to change a spraying direction. That is, preferably, the scattering unit 260 may be configured to be rotatable and allow the sprayed inert gas to be sprayed to a wider region.

Hereinafter, a detailed configuration of the filter assembly 230 will be described with reference to FIG. 7.

Figure 7:
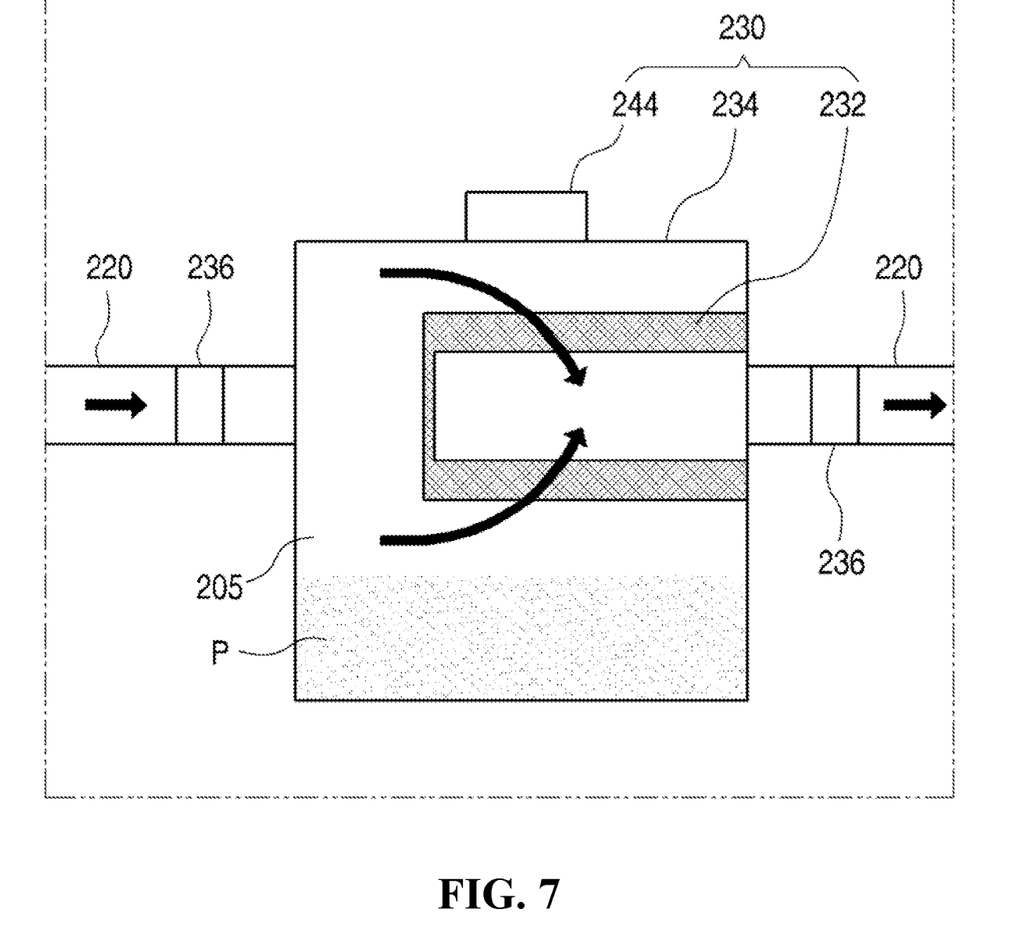
FIG. 7 is a cross-sectional view showing a detailed configuration of a filter assembly which is one configuration in the 3D printer having the residual powder removal device according to the present invention.

FIG. 7 is a cross-sectional view showing the detailed configuration of the filter assembly 230 which is one configuration in the 3D printer 100 having the residual powder removal device 200 according to the present invention.

The filter assembly 230 is disposed between the gas flow paths 220 and has a fastener 236 disposed at both sides. The fastener 236 is a configuration for separating the filter assembly 230 from the gas flow path 220 when necessary.

Also, preferably, the fastener 236 may maintain a sealed state so that the inert gas or the metal powder P does not leak during the operation of the residual powder removal device 200.

The filter assembly 230 includes a filter 232 configured to form an inert gas flow path in a direction from the outside to the inside to filter the residual powder, a filter housing 234 configured to form a space in a state in which the filter 232 is accommodated therein and communicate with the gas flow path 220 to cause the inert gas to pass therethrough and be exhausted, and the regeneration vibration generator 244 described above.

The filter 232 has a cylindrical shape, and the inside of the filter 232 is formed to be open only toward the right. Numerous air flow holes may be formed in the cylinder itself and allow the inert gas to pass. The air flow hole is configured to have an inner diameter less than a particle diameter of the metal powder P and thus selectively filters only the metal powder P.

Therefore, the amount of filtered metal powder P is larger at sites close to an outer surface of the filter 232.

The filter 232 is accommodated inside the filter housing 234, and a right side of the filter housing 234 is coupled to communicate with the gas flow path 220.

Therefore, the inert gas introduced into the filter 232 via the filter 232 may move rightward and be introduced into the gas flow path 220.

A powder collection space 238 is formed inside the filter housing 234. The powder collection space 238 refers to a space disposed below the filter 232 in the space inside the filter housing 234 and is a space where the metal powder P falling after being separated from the filter 232 is loaded and collected.

When fastening of the fastener 236 is released and the filter assembly 230 is separated, the metal powder P collected in the powder collection space 238 may be moved to a separate storage space and reused.

Also, since the metal powder P collected in the powder collection space 238 has a risk of explosion when in contact with air or water, preferably, the fastener 236 may be configured to have a sealing function.

The regeneration vibration generator 244 is disposed at an upper side of the filter housing 234. The regeneration vibration generator 244 is a configuration for providing vibrations to the filter housing 234 and the filter 232 and shaking off the metal powder P attached to the filter 232.

Therefore, due to the vibrations generated by the regeneration vibration generator 244, the air flow hole of the filter 232 may secure a large opening ratio, and thus filtering efficiency may be maximized.

Hereinafter, a method of removing the residual powder from inside the chamber 130 in the 3D printer 100 configured as described above will be described with reference to FIGS. 5 to 9.

Figure 8:
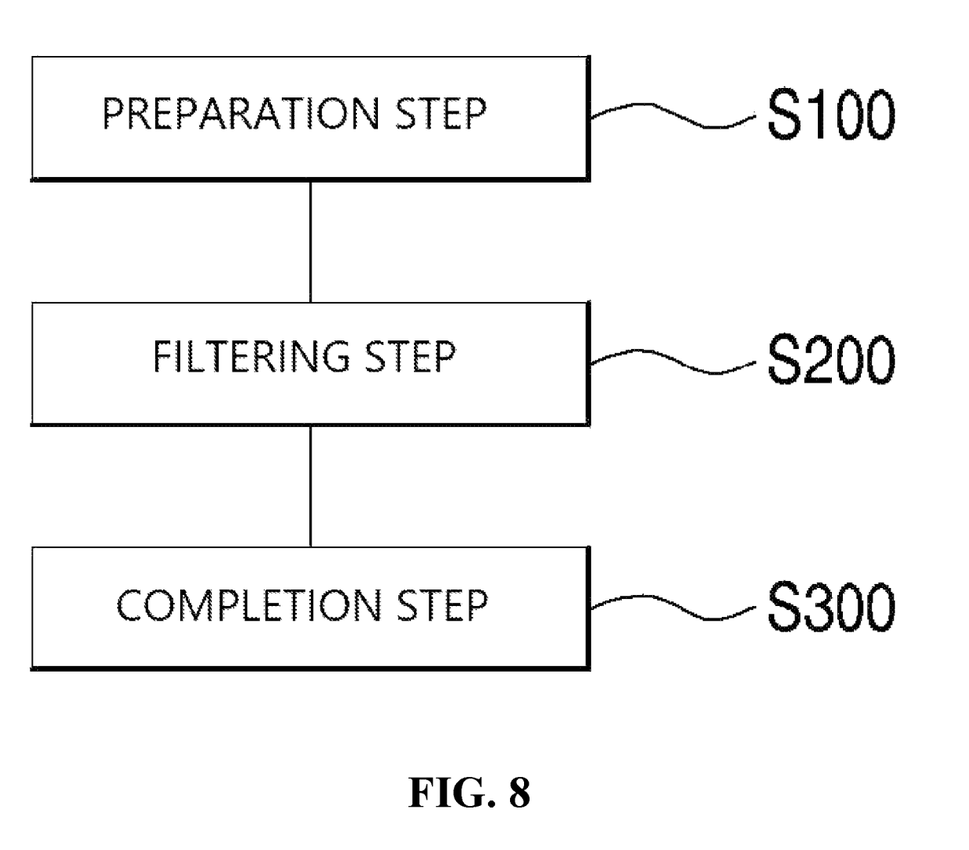
FIG. 8 is a flowchart illustrating a method of removing the residual powder from the 3D printer using the residual powder removal device according to the present invention.
Figure 9:
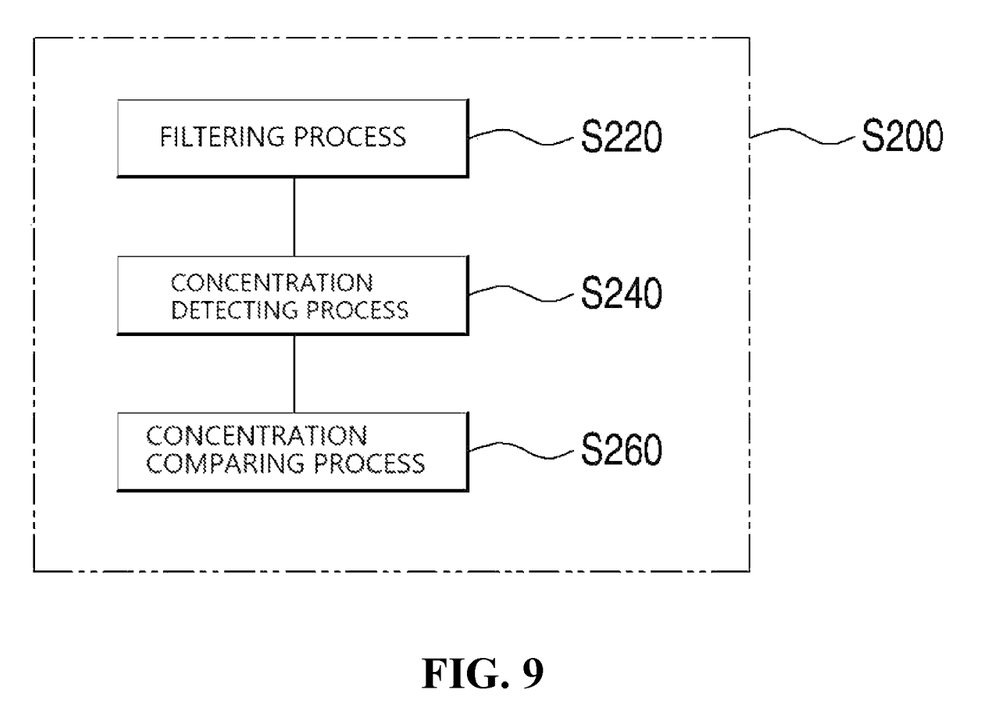
FIG. 9 is a flowchart illustrating a filtering step in detail, which is one step in the method of removing the residual powder from the 3D printer using the residual powder removal device according to the present invention.

FIG. 8 is a flowchart illustrating a method of removing the residual powder from the 3D printer 100 using the residual powder removal device 200 according to the present invention, and FIG. 9 is a flowchart illustrating a filtering step (S200) in detail, which is one step in the method of removing the residual powder from the 3D printer 100 using the residual powder removal device 200 according to the present invention.

As in the drawings, the method of removing the residual powder using the residual powder removal device 200 is completed by sequentially performing a preparation step (S100) of applying power to the concentration measurer 138 and the residual powder removal device 200 to prepare for removal of the residual powder, the filtering step (S200) of filtering the residual powder included in the inert gas flowing due to the residual powder removal device 200, and a completion step (S300) of ending the operation of the concentration measurer 138 and the residual powder removal device 200.

In the preparation step (S100), the concentration measurer 138 continuously measures the concentration of the metal powder P inside the chamber 130 and provides the measured values to the control panel. As in FIG. 6, the forming part 136 moves upward and causes the 3D part D to be located inside the chamber 130.

Here, preferably, the residual powder inside the forming part 136 may be located inside the printing space 132, and upper portions of the storage 134 and the powder recovery container 150 may be covered by a separate cover 133.

In the filtering step S200, the regeneration vibration generator 244 is operated to limit the cohesion of the residual powder in the filter 232, and the expansion vibration generator 242 is also operated to block the attachment of the residual powder onto the inner wall of the gas flow path 220.

In more detail, the filtering step (S200) includes a filtering process (S220) of selectively filtering only the residual powder among the residual powder and the inert gas, a concentration detecting process (S240) of detecting the concentration of the residual powder inside the chamber 130, and a concentration comparing process (S260) of comparing the concentration of the residual powder detected in the concentration detecting process (S240) with a predetermined concentration.

The filtering process (S220) is a process in which the residual powder introduced into the filter assembly 230 along with the inert gas is filtered by the filter 232. Due to the action of the expansion vibration generator 242, the residual powder attached to the filter 232 may be separated from the filter 232 and fall and then be collected in the powder collection space 238.

During the filtering process (S220), the regeneration vibration generator 244 causes the residual powder, which is attached to the filter 232, to fall and increases the opening ratio of the filter 232. In this way, the filter 232 is regenerated.

The concentration detecting process (S240) is a process in which the amount of residual powder inside the chamber 130 is measured using concentration.

The concentration detecting process (S240) and the concentration comparing process (S260) are simultaneously performed. The concentration comparing process (S260) is a process in which the measured concentration of the residual powder inside the chamber 130 is continuously compared with a predetermined concentration.

That is, in a case where a value of the concentration of the residual powder inside the chamber 130 that is measured by the concentration measurer 138 is less than or equal to the predetermined concentration, further operation of the residual powder removal device 200 is unnecessary, and thus, on the basis of this, the method may proceed to the completion step (S300) by stopping the operation of the residual powder removal device 200.

Therefore, when the measured concentration is less than or equal to the predetermined concentration in the concentration comparing process, the operation of the concentration measurer 138 and the residual powder removal device 200 is ended to perform the completion step (S300).

The scope of the present invention is not limited to the embodiments described herein, and various other modifications may be made by those of ordinary skill in the art on the basis of the present invention within the technical scope same as the above.

INDUSTRIAL APPLICABILITY

According to a 3D printer having a residual powder removal device according to the present invention, the residual powder can be quickly recovered, and a risk of explosion can be prevented by an inert gas in advance. Thus, the present invention has high industrial applicability.

What is claimed is:

1. A 3D printer having a residual powder removal device, the 3D printer comprising:
a cabinet configured to form an exterior and protect a plurality of parts embedded therein;
a chamber which is configured to form a printing space, where a 3D part is formed by being irradiated with a laser from a laser irradiator inside the cabinet, and which has an inner edge formed to be rounded;
a concentration measurer configured to measure a concentration of metal powder scattered inside the chamber;
a powder transfer unit configured to transfer the metal powder from inside the chamber; and a residual powder removal device configured to spray an inert gas into the chamber to forcibly scatter cohered metal powder, discharge the metal powder scattered inside the chamber to the outside along with the inert gas, and cause the metal powder to pass through a filter assembly so that the metal powder is filtered and the residual metal powder is removed from inside the chamber, wherein the residual powder removal device includes a pump configured to force a gas flow, a gas flow path configured to guide a gas, which is forced to flow by the pump, to pass through the inside of the chamber, the filter assembly installed on one side of the gas flow path to filter the residual powder included in the gas, a vibration generator configured to generate vibrations on one side of the gas flow path and the filter assembly to limit the cohesion of the residual powder, a gas supply path configured to communicate with the gas flow path and the inside of the chamber to supply an inert gas, and a scattering unit disposed inside the chamber and configured to communicate with the gas flow path and spray the inert gas into the chamber to scatter the residual powder.

2. The 3D printer of claim 1, wherein the filter assembly includes:
- a filter configured to form an inert gas flow path in a direction from the outside to the inside to filter the residual powder;
- a filter housing configured to form a space in a state in which the filter is accommodated therein and communicate with the gas flow path to cause the inert gas to pass therethrough and be exhausted; and
- a regeneration vibration generator configured to generate vibrations on one side of the filter housing to separate the residual powder cohered in the filter and regenerate the filter.

3. The 3D printer of claim 2, wherein a powder collection space configured to collect the residual powder falling after being separated from the filter due to the regeneration vibration generator is provided inside the filter housing.

4. The 3D printer of claim 3, wherein the scattering unit includes a plurality of nozzles and changes a direction in which the inert gas is sprayed.

5. The 3D printer of claim 4, wherein the residual powder removal device is operated or stopped in accordance with the concentration measurer.

* * * * *